Feb. 7, 1933.         G. C. PEARSON         1,896,368
LUBRICATOR
Filed March 21, 1930
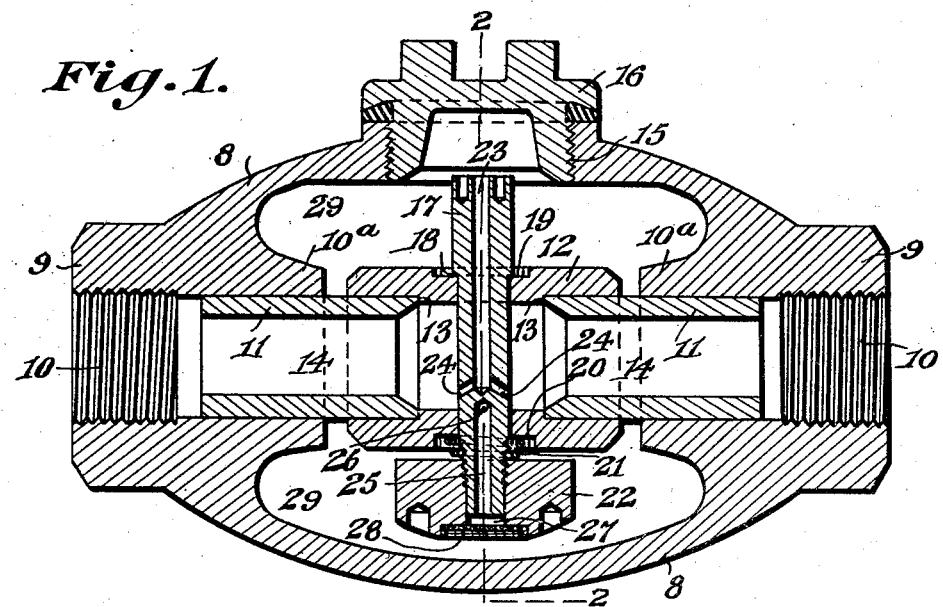
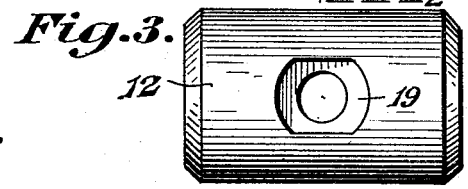
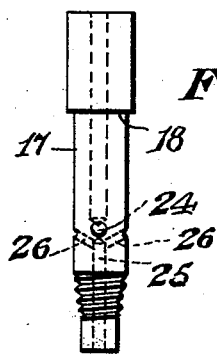
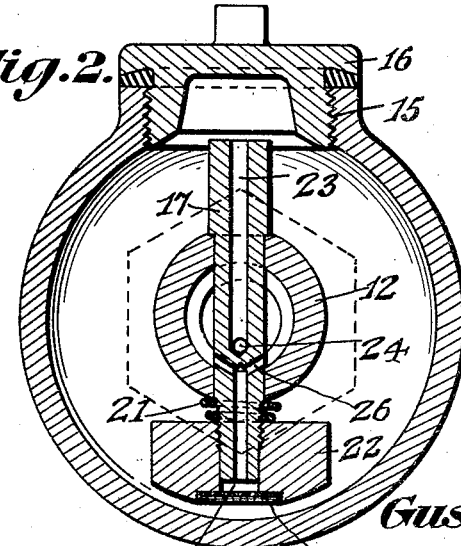
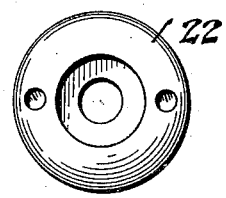
Inventor
Gustav C. Pearson,
By
Attorney Patented Feb. 7, 1933

1,896,368

UNITED STATES PATENT OFFICE

GUSTAV C. PEARSON, OF DENVER, COLORADO, ASSIGNOR TO GARDNER-DENVER COMPANY, OF DENVER, COLORADO, A CORPORATION OF DELAWARE

LUBRICATOR

Application filed March 21, 1930. Serial No. 437,827.

The object of the present invention is to provide a novel form of structure for utilization in hose lines for the purpose of delivering lubricant to the fluid stream prior to its introduction to a pneumatic or other fluid operated tool.

Another and important object is to provide a structure in which the parts are more readily accessible for adjustment, inspection and repair.

In the accompanying drawing:

Figure 1 is a longitudinal sectional view through the preferred embodiment of the invention.

Figure 2 is a cross sectional view on the line 2—2 of Figure 1.

Figure 3 is a plan view of the pendulum weight.

Figure 4 is a view in elevation of the stem.

Figure 5 is a vertical sectional view through the nut.

Figure 6 is a bottom plan view of said nut.

Figure 7 is a detail side elevation of the holding spring.

In the embodiment disclosed, a casing 8 is employed of elongated form with tapering ends that terminate in nipples 9 that are internally threaded as shown at 10. Into the nipples are adapted to be screwed the couplings of the hose sections. The nipples 9 project inwardly to form extensions 10a into which are pressed bushings 11 that are in alinement and terminate short of each other. The inwardly projecting portions of the bushings 11 form gudgeons on which is journaled a sleeve 12 having internal shoulders 13 abutted by the inner ends of the bushings 11. A passageway 14 through the casing is thus provided between the nipples 9 for the flow of the fluid under pressure.

In one side of the casing is an opening 15 giving access to the interior of said casing. The walls of the opening are threaded to receive a closure plug 16. The diameter of the opening 15 is sufficiently great to permit the introduction therethrough of the sleeve 12.

Extending transversely through the sleeve 12 between the inner ends of the bushings 11 is a stem 17 that is rotatable in the sleeve. The upper and larger end of the stem 17 terminates in a shoulder 18 that rests against a flattened portion 19 on one side of the sleeve. The opposite side of said sleeve is also flattened, as shown at 20 and bearing against this flattened portion is a coiled spring 21 that also bears against a weight 22 threaded on the smaller and lower end of the stem. The weight 22 is in the form of an enlarged nut which is also capable of being passed through the opening 15 of the casing.

Extending longitudinally through the upper portion of the stem is a passageway 23 that opens into the upper portion of the interior of the casing. The lower end of this passageway is in communication by oppositely extending ports 24 with the motive fluid passageway 14. Extending longitudinally through the lower end of the stem is a lubricant passageway 25 opening through lateral ports 26 into the motive fluid passageway 14. The lower end of this passageway 25 opens into a port 27 formed through the weight or nut 22 and this port is preferably covered by a screen 28 secured in the lower portion of the nut.

It will be understood that the interior of the casing around the passageway 14 and designated by the reference numeral 29 constitutes a lubricant reservoir and may be filled through the opening 15 when the plug 16 is removed therefrom. Air under pressure or other motive fluid passing through the passageway 14 from one nipple 9 to the other will cause lubricant to flow upwardly through the passageway 25 and carry it away with it to the tool supplied with the motive fluid. The tool is thus lubricated. The amount of lubricant admitted to the air stream can be governed by turning the stem 17 and this can be accomplished by removing the plug 16, which gives access to the upper end of said stem. As these lubricators are ordinarily connected to portable tools, it will be evident that they are moved about and consequently the casing is apt to turn to different positions, but as the weight 22 will always take a lowermost position, the lower end of the stem will therefore always be submerged in the lubricant.

In assembling this structure, the sleeve is introduced into the casing before the bushings are pressed inwardly and said sleeve is held in a position to receive the sleeves 11 when they are pressed in. The stem may then be introduced into the sleeve and receive the nut so that the parts may all be introduced and assembled after the formation of the casing. The spring 21 not only serves to hold the stem properly seated but acts as a friction device to prevent the accidental turning of said stem.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. A lubricator comprising a casing having a lubricant reservoir, a fluid passageway through the casing including a sleeve member rotatably mounted in the casing, a weight detachably connected to the sleeve member, rotatable means forming the connection between the weight and sleeve member for directing and controlling the flow of lubricant from the reservoir into the fluid passageway, and resilient means surrounding the rotatable means and interposed between the weight and sleeve member for preventing the movement of said rotatable means with respect to the sleeve member.

2. A lubricator comprising a casing having a lubricant reservoir, a fluid passageway through the casing including a sleeve member rotatably mounted in the casing, a stem rotatably mounted transversely in the sleeve member and having a passageway in communication with the fluid passageway and with the lubricant reservoir, a weight mounted on one end of the stem, and a spring interposed between the weight and the sleeve member.

3. A lubricator comprising a casing having a lubricant reservoir, a fluid passageway through the casing including a rotatable sleeve member journaled in the casing, said casing having an entrance opening in one side of sufficient area to permit the introduction of the sleeve member into the casing, a stem extending transversely through the sleeve member and adapted to aline with the entrance opening, said stem having a shoulder engageable with a seat formed on the sleeve member, a weight that is insertible through the entrance opening, and detachably mounted on the stem, a lubricant channel in the stem communicating with the lubricant reservoir and the fluid passageway, and resilient means surrounding the stem and interposed between the weight and sleeve member to hold the stem against its seat and prevent movement of the stem with respect to the sleeve member.

4. A lubricator comprising a casing having a fluid inlet port in one end and a fluid outlet port in the other end, a fluid passageway connecting the ports and including a sleeve rotatably mounted in the casing, said casing having an inlet opening on one side and in line with the sleeve, a stem rotatably mounted in the sleeve transversely thereof, and having both ends available through the inlet opening, one end of the stem having means by which the stem may be turned, a weight detachably mounted on the other end of the stem, said stem having means for admitting lubricant from the casing into the sleeve, and a spring surrounding the stem and interposed between the weight and sleeve member to hold the stem in place and prevent movement of the stem with respect to the sleeve member.

5. A lubricator comprising a casing having a lubricant reservoir, a fluid passageway through the casing, including a sleeve member rotatably mounted in the casing, a stem extending transversely through the sleeve member and having passageways for conducting lubricant from the reservoir to the fluid passageway, a shoulder adjacent one end of the stem adapted to engage a seat formed on the periphery of the sleeve member, a weight connected to the other end of the stem, and a spring positioned between the weight and sleeve member to hold the stem in its seat to prevent movement of the stem with respect to the sleeve member.

6. A lubricator comprising a casing having a lubricant reservoir, a fluid passageway through the casing, including a rotatable sleeve member journaled in the casing, means carried by the sleeve for directing lubricant from the reservoir into the fluid passageway, a weight detachably connected to said means at one side of the sleeve, and resilient means interposed between the weight and sleeve member to prevent longitudinal or rotary movement of the first said means with respect to the sleeve member.

In testimony whereof, I affix my signature.

GUSTAV C. PEARSON.